(12) United States Patent
Sonntag et al.

(10) Patent No.: US 10,184,784 B2
(45) Date of Patent: Jan. 22, 2019

(54) DEVICE AND METHOD FOR MEASURING THE WIDTH AND THICKNESS OF A FLAT OBJECT

(71) Applicant: MICRO-EPSILON Messtechnik GmbH & Co. KG, Ortenburg (DE)

(72) Inventors: Achim Sonntag, Tiefenbach (DE); Herbert Fuellmeier, Egglham (DE); Gerhard Kirschner, Passau (DE)

(73) Assignee: MICRO-EPSILON Messtechnik GmbH & Co. KG, Ortenburg (DE)

( * ) Notice: Subject to any disclaimer, the term of this patent is extended or adjusted under 35 U.S.C. 154(b) by 0 days.

(21) Appl. No.: 15/314,655

(22) PCT Filed: May 3, 2016

(86) PCT No.: PCT/DE2016/200202
§ 371 (c)(1),
(2) Date: Nov. 29, 2016

(87) PCT Pub. No.: WO2016/177369
PCT Pub. Date: Nov. 10, 2016

(65) Prior Publication Data
US 2017/0205225 A1      Jul. 20, 2017

(30) Foreign Application Priority Data
May 5, 2015   (DE) .................. 10 2015 208 326

(51) Int. Cl.
*G01B 11/14*   (2006.01)
*G01B 11/04*   (2006.01)
(Continued)

(52) U.S. Cl.
CPC ............. *G01B 11/04* (2013.01); *G01B 11/06* (2013.01); *G01B 21/06* (2013.01); *G01B 21/08* (2013.01)

(58) Field of Classification Search
CPC ................................ G01B 11/04; G01B 11/06
(Continued)

(56) References Cited

U.S. PATENT DOCUMENTS 5,021,674 A    6/1991   Brunner
5,339,029 A    8/1994   Wagner
(Continued)

FOREIGN PATENT DOCUMENTS

CA    2341058 A1    9/2001
DE    3543852 A1    6/1987
(Continued)

OTHER PUBLICATIONS

The International Bureau of WIPO, International Preliminary Report on Patentability (English translation of ISA's Written Opinion) for International Application No. PCT/DE2016/200202, dated Nov. 7, 2017, 6 pages, Switzerland.
(Continued)

*Primary Examiner* — Tri T Ton
(74) *Attorney, Agent, or Firm* — Alston & Bird LLP

(57) ABSTRACT

The invention relates to a device serving for the combined measurement of the width and thickness of a flat object, in particular a plate, a belt, or a web. The device comprises a measurement apparatus which has at least one contactless sensor, which is for width measurement on the object and which is movable crosswise to the longitudinal direction or conveying direction of the object. According to the invention, on the opposite side of the object, there is a second sensor opposite the first sensor which, together with the first sensor, serves for thickness measurement on the object, wherein the two sensors can travel above and below the object, that is, on opposite sides of the object.

23 Claims, 23 Drawing Sheets

(51) Int. Cl.
  *G01B 21/06* (2006.01)
  *G01B 21/08* (2006.01)
  *G01B 11/06* (2006.01)

(58) Field of Classification Search
  USPC .............. 356/237.1–237.6, 239.1–239.8
  See application file for complete search history.

(56) References Cited

U.S. PATENT DOCUMENTS

| | | | |
|---|---|---|---|
| 6,480,802 B1 | 11/2002 | Flormann | |
| 8,217,377 B2 | 7/2012 | Jepsen et al. | |
| 2007/0291283 A1* | 12/2007 | Sakai | G01B 11/022 356/630 |
| 2009/0056412 A1* | 3/2009 | Graeffe | D21G 9/0009 73/1.81 |
| 2012/0170059 A1 | 7/2012 | Typpo et al. | |

FOREIGN PATENT DOCUMENTS

| | | |
|---|---|---|
| DE | 3900928 C1 | 6/1990 |
| DE | 4126921 C2 | 1/1996 |
| DE | 10013786 A1 | 10/2001 |
| DE | 10060144 A1 | 6/2002 |
| DE | 102006024761 A1 | 11/2007 |
| WO | WO 1998/014751 A1 | 4/1998 |
| WO | WO 2001/088473 A1 | 11/2001 |
| WO | WO 2012/139571 A1 | 10/2012 |

OTHER PUBLICATIONS

International Searching Authority, International Search Report (ISR) and Written Opinion for International Application No. PCT/DE2016/200202, dated Aug. 25, 2016, 13 pages, European Patent Office, Netherlands.

* cited by examiner

Step 7: Detection of the next edge – width measurement

DEVICE AND METHOD FOR MEASURING THE WIDTH AND THICKNESS OF A FLAT OBJECT

CROSS REFERENCE TO RELATED APPLICATIONS

This application is a national stage application, filed under 35 U.S.C. § 371, of International Application No. PCT/DE2016/200202, filed May 3, 2016, which claims priority to German Application No. 10 2015 208 326.8, filed May 5, 2015; the contents of both of which as are hereby incorporated by reference in their entirety.

BACKGROUND

Technical Field

The invention concerns a device for the combined measurement of the width and thickness of a flat object, in particular a plate, a belt, or a web. Furthermore, the invention concerns a corresponding method for the combined measurement of the width and thickness of a flat object.

Basically, this concerns the measurement of width and thickness of any objects, it being possible for the objects to be in the form of piece goods (e. g. plates), or web-like objects (e. g. belts). The measurement takes place regularly in a measuring gap with a measuring mechanism or measuring device mounted on a machine frame, the measuring device comprising at least one position sensor directed toward the measuring object.

Description of Related Art

Devices and methods in the class have been known for years in practice, in many different embodiments. Thus, the width measurement of belt material takes place by means of C- or O-frame-like measuring arrangements, the measuring device comprising contactless sensors.

Specifically, it is known that width measurement can be performed with two position sensors, which measure the respective edge of the measured object from both sides. The difference of the two measurement reading signals gives the thickness of the measured material if the separation between the two separation measurement sensors is known. If the object is belt material, crosswise measuring methods are used, both path measuring sensors mostly being moved in pairs crosswise to the conveying device, respectively the lengthwise direction of the belt material. According to DE 3 543 852 A1 or DE 39 00 928 C1 optical sensors, according to DE 4 126 921 C2 inductive sensors, or according to DE 10 2006 024 761 A1 contacting sensors are used for scanning.

Furthermore, thickness measurement is sufficiently known from practical experience. WO 1998/014751 A1 is to be consulted as only one example of this.

If both the width and the thickness of the material are to be monitored during the production of belt-like metal sheets or webs of very different materials, up now it has been necessary to use two different systems and correspondingly different measuring devices, namely on the one hand a device for measuring the width of the object and on the other hand a device for measuring the thickness of the object. This is expensive with respect to structure/equipment and requires considerable construction space.

BRIEF SUMMARY

Therefore, the task of the present invention is to configure a device of the generic kind and a corresponding method in such a way that combined measurement of width and thickness of objects is possible with the least possible construction space and equipment expense.

According to the invention, the preceding task is addressed by a device having the features of the pending claims provided herein. Accordingly, the device comprises at least one contactless sensor for width measurement of the respective object. The sensor is movable crosswise to the longitudinal direction or conveying direction of the object. A second sensor opposite the first sensor, which serves together with the first sensor for conventional thickness measurement of the object, is provided on the opposite side of the object. The two sensors can be moved above and below the object on opposite sides.

In addition to piece goods, it is possible for the "target" to be belts or webs, for example plastic webs, metal belts, paper webs, as well as fleece, etc.

Corresponding to the features of the pending claims provided herein, the width measurement is combined with the thickness measurement, one of at least two sensors being involved with both measurements. According to the invention, the measurement of width and thickness is combined in a single device, so that the least possible equipment expense is required.

The processing of the measurement as well as basic algorithms correspond to the method used up to now using contactless sensors, so that it is possible to dispense with an explanation of this.

It is particularly advantageous to make the sensors to be used as optical sensors, it being possible for them to be laser sensors or laser profile sensors or laser scanners The laser profile sensors measure the width of the object, for example the width of one or more belts lying/running beside one another, each of the two sensors detecting an edge of the belt to be measured. The laser line here is located crosswise to the edge of the belt. The laser profile sensors are fastened to sensor carriages, which rest on a guide or crossing unit in a further advantageous way, so that width measurement can be performed on belt material of different width. Correspondingly, it is possible to move the laser profile sensors crosswise to the belt direction corresponding to the length of the crosspiece.

In a further advantageous way, the two sensors are coupled in their movement, for example mechanically, and accordingly run synchronously. Other kinds of coupling also can be realized.

As already presented above, the two sensors move along a crosspiece or the like, advantageously on a carriage, together above and below the object to the edge areas or edges of the object, and certainly over the object and up to the opposite edge area or to the edge and back. Moving along and determining the edge coordinates of the object serves for width measurement and running over the object serves for thickness measurement.

The measuring device advantageously includes at least a third contactless sensor, advantageously also an optical sensor, in particular a laser sensor or a laser profile sensor or laser scanner, which serves for width measurement together with the first sensor. The third sensor operates independently of the first two sensors and is advantageously movable on a carriage with its own drive along one of the two crosspieces. Advantageously, the third sensor travels on the same crosspiece as the first sensor. It is to be noted that the term "crosspiece" is to be understood simply as a linear guide.

The measuring device can be associated with a C-frame or O-frame, it being essential that the sensors are movable along a crosspiece crosswise to the direction of travel of the object.

It is further advantageous if the measuring device includes a calibration standard, on which reference measurements serving for calibrating the sensors/the measuring system can be performed. Integral calibration of the measuring device is performed in this way.

It is further advantageous if a gauge, for example a ruler or the like, containing reference marks, having less or no thermal expansion at all in the relevant temperature range, is provided for compensation of thermal expansions of the object, in particular the belt. It is possible to make the reference marks as optical, electrical, and/or magnetic marks, which are detectable corresponding to their nature. The position of the reference marks can be detected with one of the already present sensors or by a further sensor during a possibly separate calibration run.

The invented method according to the pending claims provided herein uses the device according to the invention, two sensors coupled in their movement and movable parallel to one another (sensor 1 and sensor 2) being used for thickness measurement and a further sensor (sensor 3), together with one of the first two sensors (sensor 1 or sensor 2) being used for width measurement. The first two sensors move at a predetermined measuring speed along the crosspiece and advantageously will move continuously. The third sensor moves at a higher speed to the outer edge of the object, stops there or stays there until the first two sensors have reached the first edge of the object.

The method according to the invention can be used on individual objects or belts or even on belts running parallel to one another for measuring width and thickness.

In addition, it is advantageous if calibration of the thickness measurement and/or the width measurement takes place either before each measurement or at regular intervals or as needed, preferably on an integral calibration standard, which belongs to the device according to the invention.

BRIEF DESCRIPTION OF THE FIGURES

There are various options for developing and implementing the teaching of the present invention in an advantageous manner. For this purpose, reference is hereby made on the one hand to the claims dependent on independent claims 1 and 11 and on the other hand to the following explanation of preferred exemplary embodiments of the invention by means of the drawing. Along with the explanation of the preferred exemplary embodiments of the invention based on the drawing, other generally preferred embodiments and implementations of the teaching are explained as well. The drawings show:

DETAILED DESCRIPTION OF VARIOUS EMBODIMENTS

Figure 1:
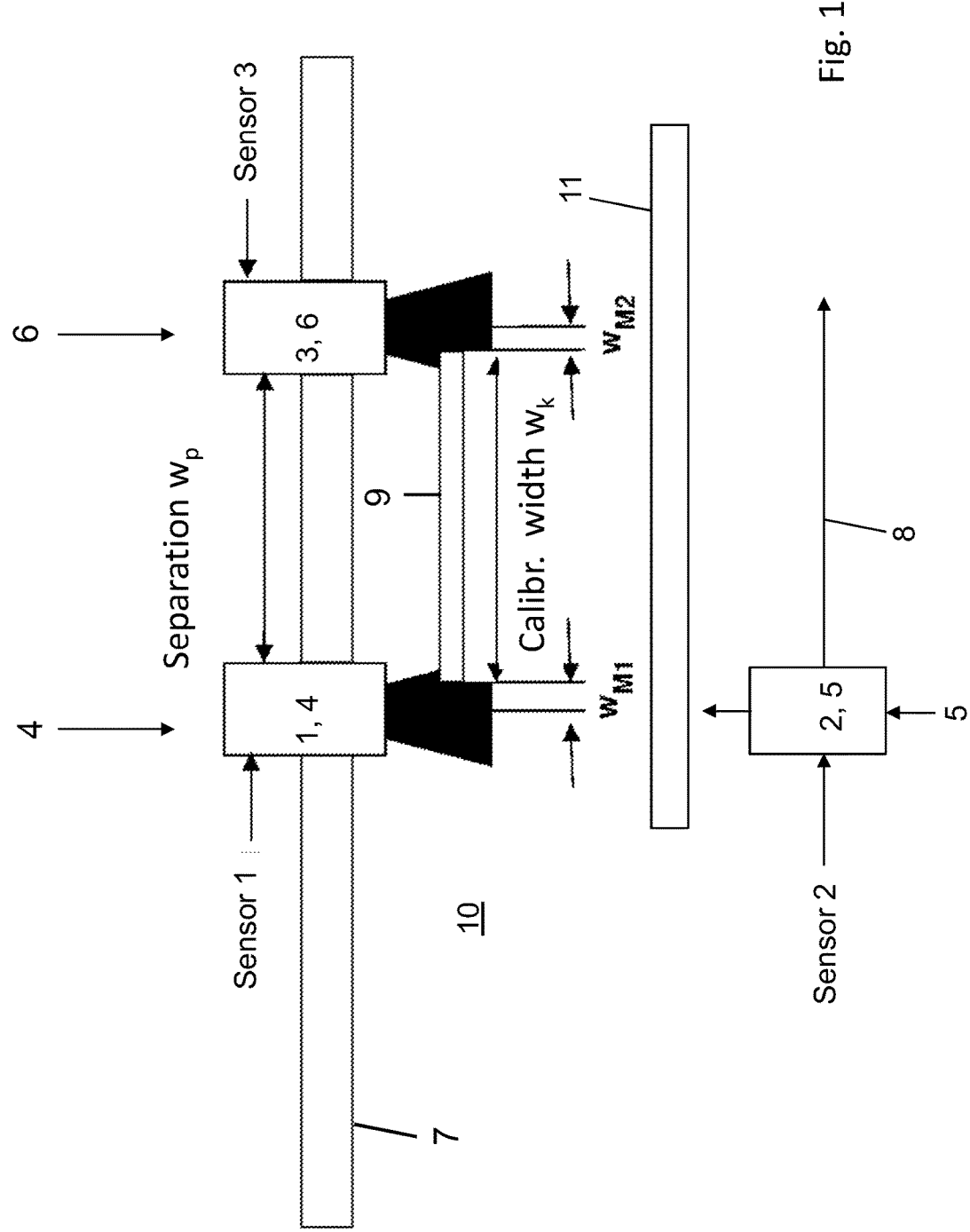
FIG. 1 in a schematic representation, the basic principle of the differential measurement and calibration, FIG. 2 in a schematic representation, a specific embodiment of a device according to the invention, in a first step, the calibration of the thickness (vertical sensor separation), FIG. 3 in a schematic representation, the device from FIG. 2, in a second step, the calibration of the width (horizontal sensor separation), FIG. 4 in a schematic representation, the device from FIG. 2, in a third step, the detection of the edges, i.e. the measurement of the width, FIG. 5 in a schematic representation, the device from FIG. 2, in a fourth step, the thickness measurement, FIG. 6 in a schematic representation, a further specific embodiment of a device according to the invention, several belts being measured beside one another, with a measuring device corresponding to FIGS. 2 to 5, in a first step, the calibration of the thickness (vertical sensor separation), FIG. 7 in a schematic representation, the device from FIG. 6, in a second step, the calibration of the width (horizontal sensor separation), FIG. 8 in a schematic representation, the device from FIG. 6, in a third step, the detection of the edges (measurement of the width), FIG. 9 in a schematic representation, the device from FIG. 6, in a fourth step, the thickness measurement, positioning of the third sensor on the next edge, FIG. 10 in a schematic representation, the device from FIG. 6, in a fifth step, the detection of the next edge—width measurement, FIG. 11 in a schematic representation, the device from FIG. 6, in a sixth step, the thickness measurement, positioning of the third sensor on the next edge, FIG. 12 in a schematic representation, the device from FIG. 6, in a seventh step the detection of the next edge—width measurement, FIG. 13 in a schematic representation, the device from FIG. 6, in an eighth step, the thickness measurement, positioning of the third sensor on the next edge, FIG. 14 in a schematic representation, the device from FIG. 6, in a ninth step, the detection of the next edge—width measurement, FIG. 15 in a schematic representation, the device from FIG. 6, in a tenth step, the thickness measurement, FIG. 16 in a schematic representation, the device from FIG. 6, in an eleventh step, the detection of the next edge—width measurement, FIG. 17 in a schematic representation, the device from FIG. 6, in a twelfth step, the thickness measurement, positioning of the third sensor on the next edge, FIG. 18 in a schematic representation, the device from FIG. 6, in a thirteenth step, the detection of the next edge—width measurement, FIG. 19 in a schematic representation, the device from FIG. 6, in a fourteenth step, the thickness measurement, positioning of the third sensor on the next edge, FIG. 20 in a schematic representation, the device from FIG. 6, in a fifteenth step, the detection of the next edge—width measurement, FIG. 21 in a schematic representation, the device from FIG. 6, in a sixteenth step, the thickness measurement, positioning of the third sensor on the next edge, FIG. 22 in a schematic representation, the device from FIG. 6, in a seventeenth step, the detection of the edges—measurement of width, and FIG. 23 in a schematic representation, a further specific embodiment of a device according to the invention with the basic precautionary measure of a device for compensation of thermal expansions of the measuring device.

FIG. 1 shows a schematic view of the basic principle of differential width measurement and calibration with two laser profile sensors (laser scanners) 1 and 3. The width of one or more belts 11 is measured with these scanners 1 and 3, each of the two sensors 1 and 3 detecting an edge of the belt to be measured 11. In this case, the laser line is directed crosswise to the edge of belt 11.

Sensors 1 and 3 are mounted on sensor carriages 4 and 6, which move on a traversing unit, by which the sensors are movable crosswise to the belt direction, so that it is possible to perform the width measurement on belt material of different widths.

The separation $w_P$ between the two sensors 1 and 3 is determined in practice by means of an incremental measuring system. In this case, an offset $w_O$ between the measured value of sensors 1 and 3 and the incrementally measured separation based on tolerances etc. is to be taken into account, the sign of the measured values from the middle of the line to the frame being chosen to be negative and from the middle of the line to the target to be positive. This offset value is determined by means of a calibration process. Let $w_{M1}$ and $w_{M2}$ be the measured values of the two sensors 1 and 3 and $w_K$ be the width of the calibration standard 9, then the offset follows from $$w_O = (w_K + w_{M1} + w_{M2}) - w_P$$

The width $w_A$ of a target or object 11 thus is calculated by:

$$w_A = w_P + w_O - (w_{M1} + w_{M2})$$

For a very precise determination of the width of the measured object it is necessary to compensate for thermal expansion of the incremental measuring system. This will be explained later for FIG. 23.

FIGS. 2 to 5 show schematic views of the basic principle of the invention, according to which the method according to the invention operates by means of a device according to the invention, and in particular, according to the example of a belt 11 as object or target.

The measuring device shown in FIGS. 2 to 5 includes a first sensor 1, an opposite second sensor 2, and a third sensor independent of the first sensor 1 and the second sensor 2 in motion. Sensors 1, 2, and 3 are optical sensors, more precisely laser profile sensors or laser scanners.

The two opposite sensors 1 and 2 are mechanically coupled in their motion, therefore they move synchronously. The third sensor 3 moves independently.

Sensors 1 and 2 are respectively associated with a carriage 4 and 5. The third sensor 3 is associated with a carriage 6. Carriages 4, 5, and 6 with the sensors 1, 2, and 3 attached thereto run along a guide or crosspiece 7, 8, sensors 1 and 3 being movable along upper crosspiece 7 and sensor 2 along lower crosspiece 8. Crosspieces 7, 8 are part of a frame not shown further in figures.

A calibration standard 9, which serves for calibration of the sensor arrangement with respect to the thickness measurement as well as with respect to the width measurement or the determination of the edges, is an integral component of the device. The measured object passes between crosspieces 7, 8, that is, in measuring gap 10, in the specific case the measured object being a single belt 11. The direction of motion of belt 11 is in the image plane. Sensors 1, 2, and 3, respectively carriages 4, 5, and 6, move crosswise to the direction of motion of belt 11.

Figure 2:
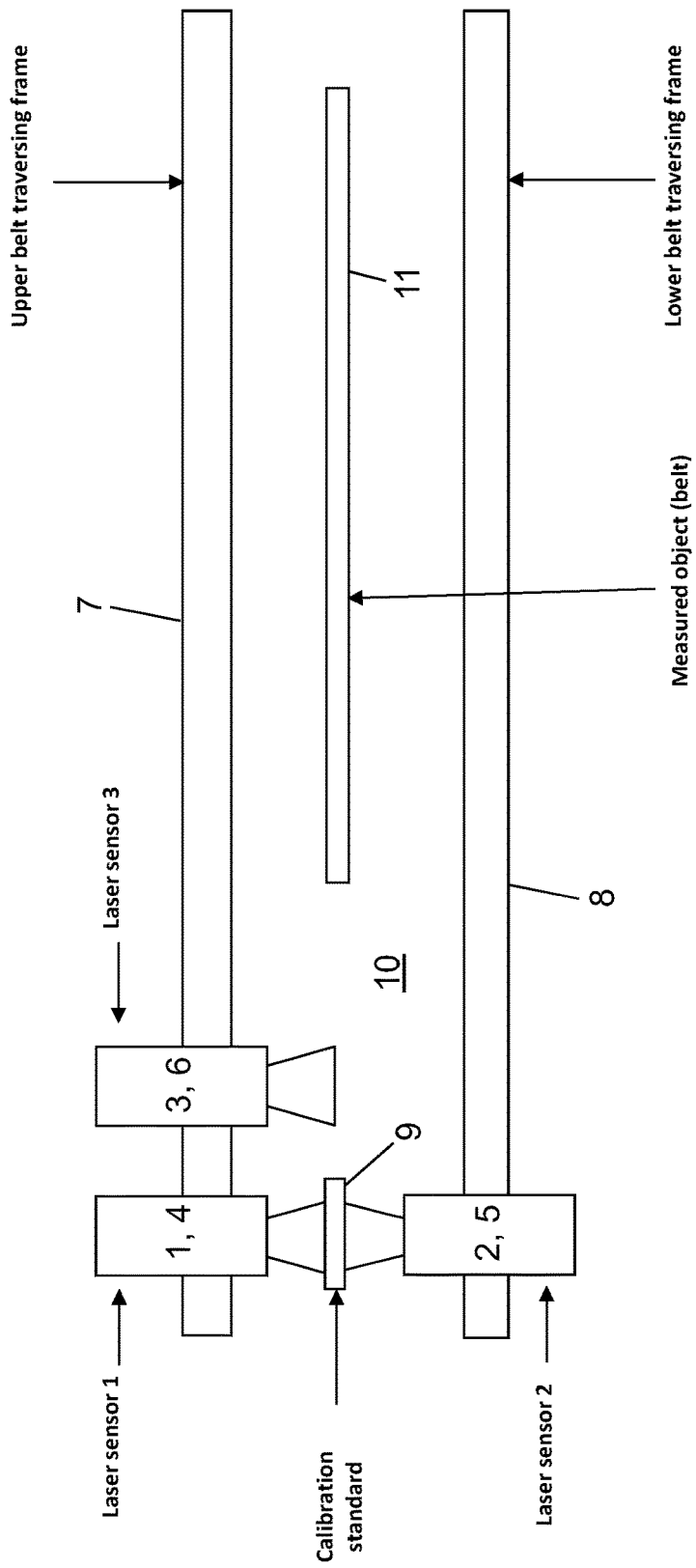

FIG. 2 specifically shows in a first step the thickness calibration by means of the calibration standard 9, the first sensor 1 and the second sensor 2 being measured with respect to one another in the known way and the calibration standard 9 being located between the two sensors 1, 2 permanently associated with one another. The third sensor 3 has no function in the first step.

Figure 3:
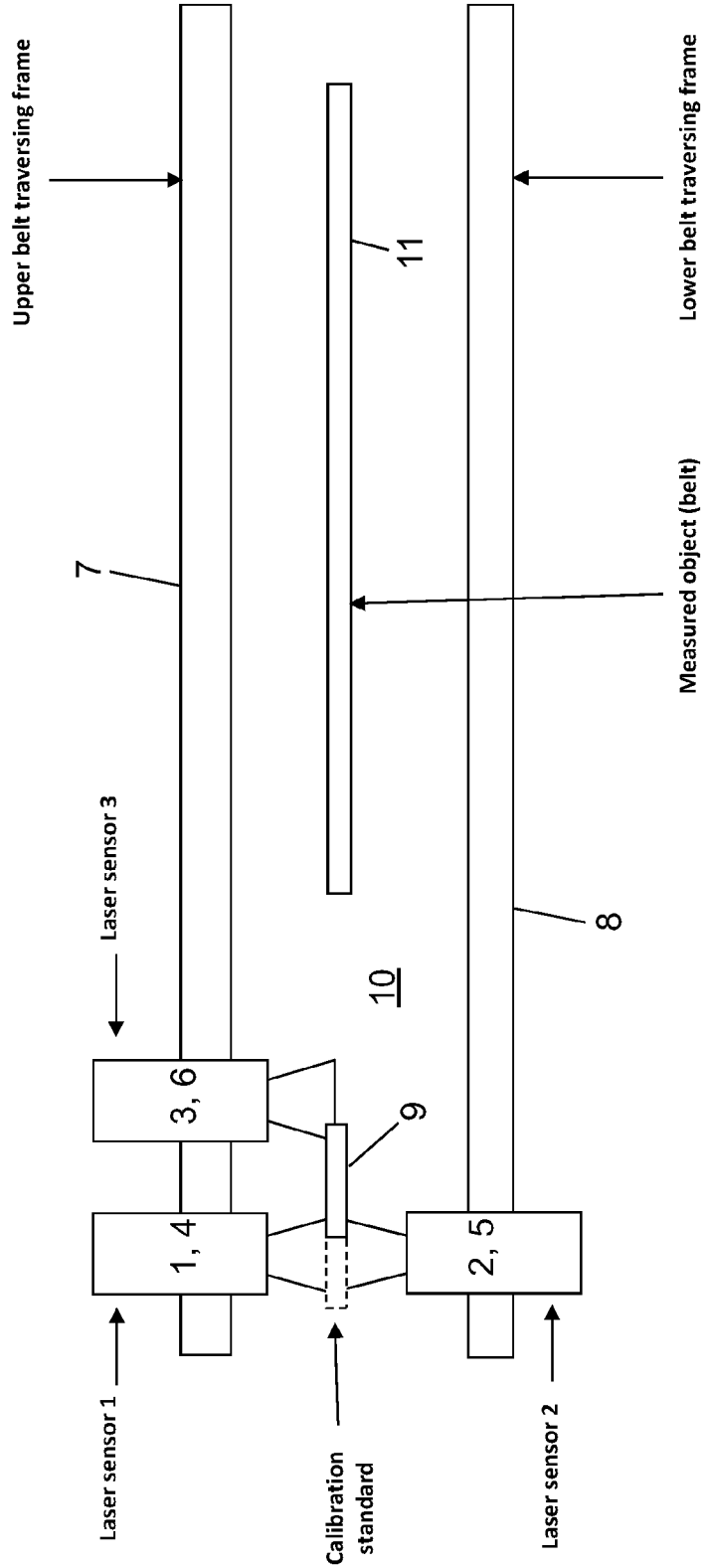

FIG. 3 shows the width calibration in the second step, the first sensor 1 and/or the second sensor 2 detecting the left edge of calibration standard 9 and the third sensor 3 detecting the right edge of calibration standard 9.

Figure 4:
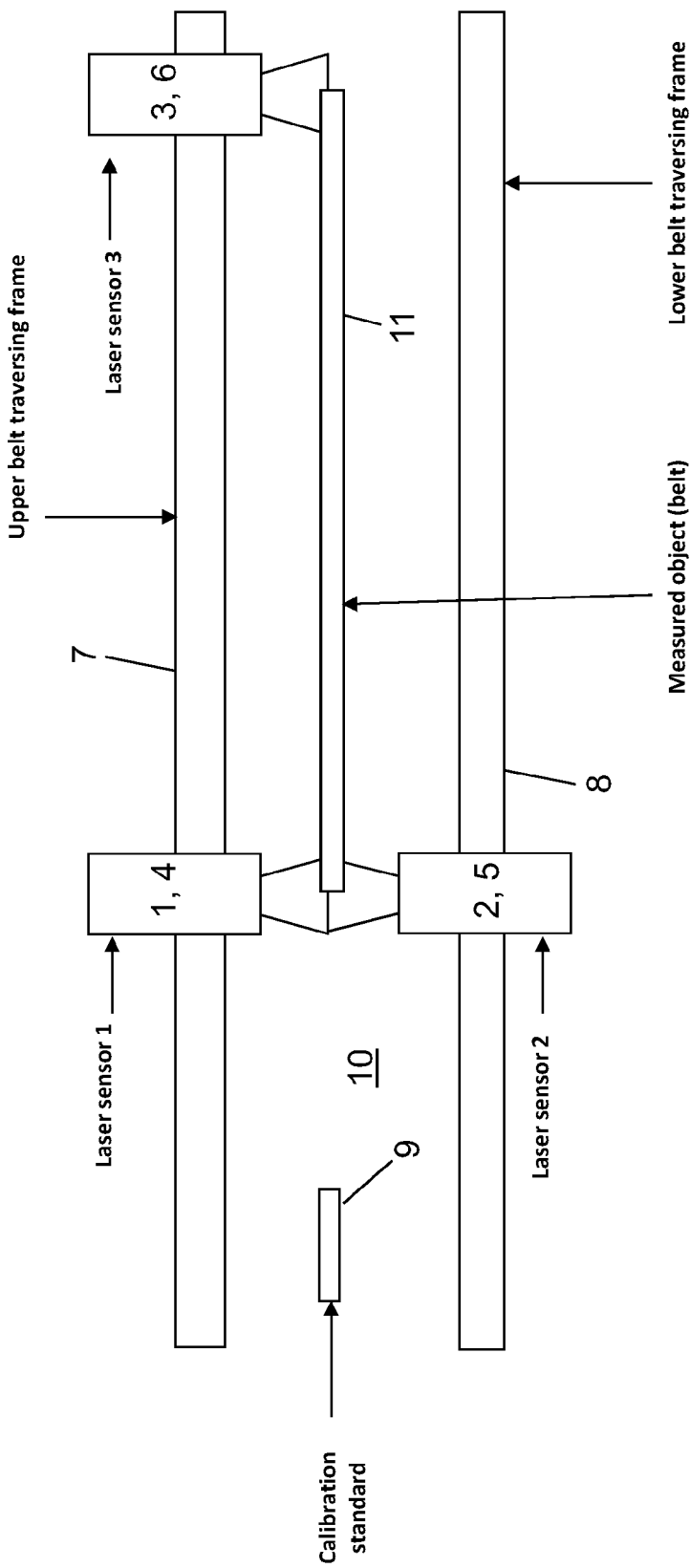

The width of belt 11 is measured in the third step according to FIG. 4, the first and second sensors 1, 2 coupled in motion detecting the left edge of belt 11 and the third sensor 3 detecting the right edge of belt 11.

Figure 5:
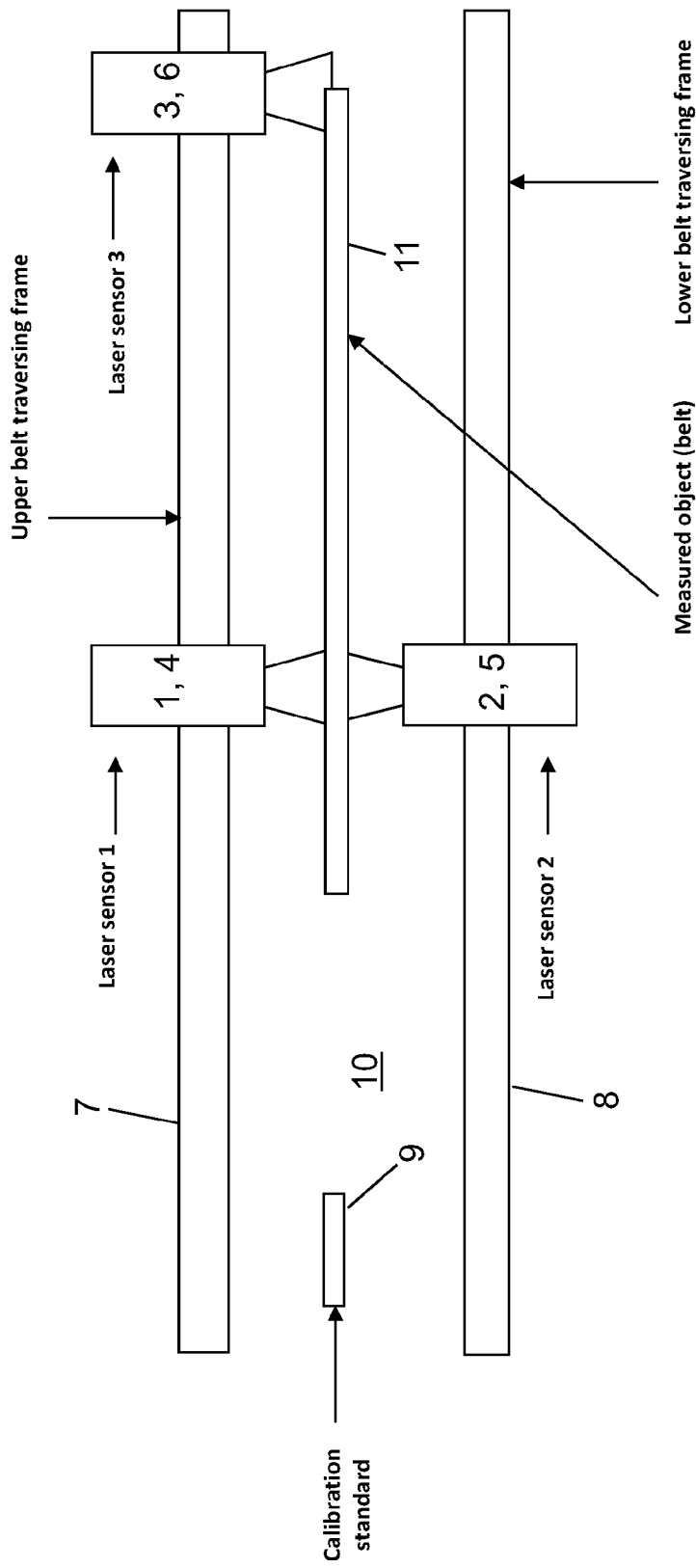

After the width measurement, the first sensor 1 and the second sensor 2 (sensor pair 1,2) travel crosswise to the direction of motion of belt 11 along the width of belt 11 to the right in order to measure the thickness of belt 11 over the entire width. Step four is shown in FIG. 5. Only after sensor pair 1, 2 has returned to the left initial position can the width be measured again corresponding to step 3 according to FIG. 4.

FIGS. 6 to 22 show a special case of width measurement of several parallel belts 11, for example in the case of steel belts as they are cut out of an originally wide single belt in so-called slitting machines with longitudinal dividing shears. Measurements of belts 11 running beside one another is performed in a way analogous to the preceding description.

Here also, first sensor 1 and second sensor 2 are mechanically coupled, so that they can be moved exclusively parallel to one another. The third sensor 3 runs on the same shaft or crosspiece 7 as the first sensor 1, but has its own drive and moves correspondingly independently of sensor 1.

Sensors 1 and 2 are used for the thickness measurement. Sensors 1 and 3 can measure the width together.

In addition, sensors 1 and 2 are moved at a predetermined, usual measuring speed, while the third sensor 3 runs at a higher speed. The first and second sensors 1 and 2 traverse continually, while sensor 3 is positioned at the respective outer edge of belt 11 and stays there until sensor pair 1, 2 detects the first edge of the belt, etc.

Figure 6:
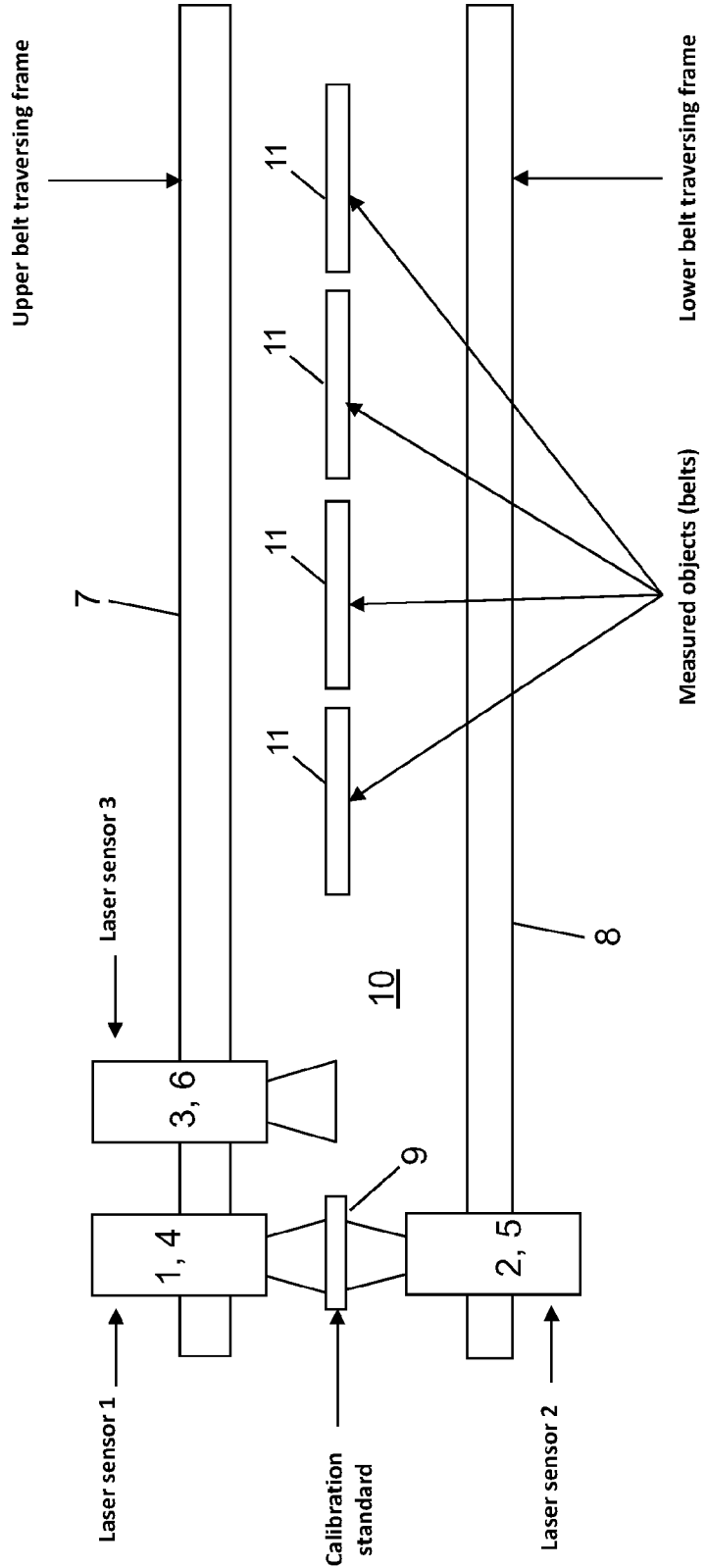

FIGS. 6 to 22 show individual steps in the sequence of the measuring routine, which result from the method according to the invention, as follows:

According to FIG. 6, step one, sensor pair 1, 2 (first sensor 1 and second sensor 2) is calibrated for the thickness measurement on a calibration standard 9 of known thickness. The sensor separation is vertical.

Figure 7:
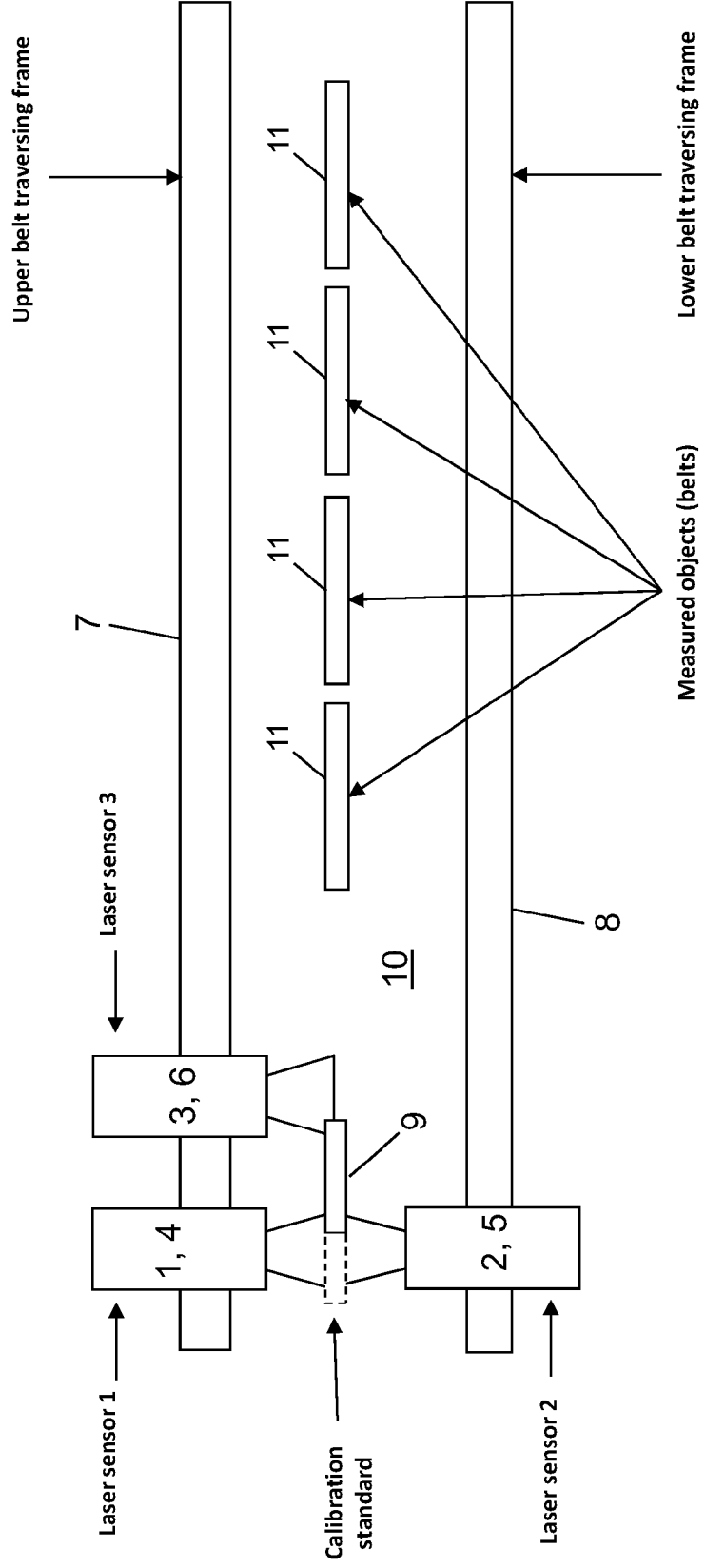

FIG. 7 shows step two, according to which the first sensor 1 and the second sensor 3 are calibrated for the width measurement on a calibration standard 9 of known width. The sensor separation is horizontal.

Figure 8:
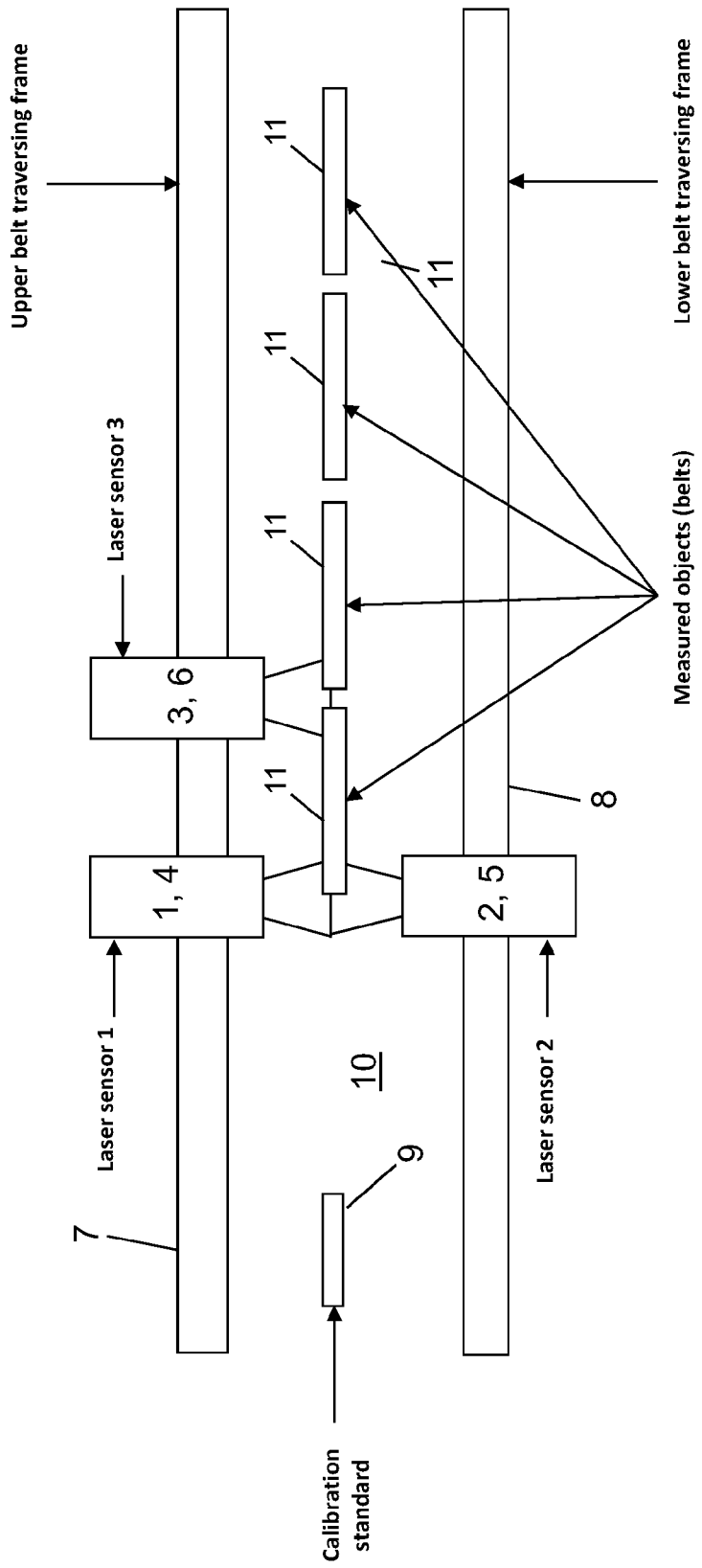

FIG. 8 shows step three, according to which sensor pair 1, 2 moves slowly to the right, until the first sensor 1 can detect the left belt edge of the first belt 11. A width measurement is performed. Independently of this, the thickness measurement takes place with sensor pair 1, 2.

Figure 9:
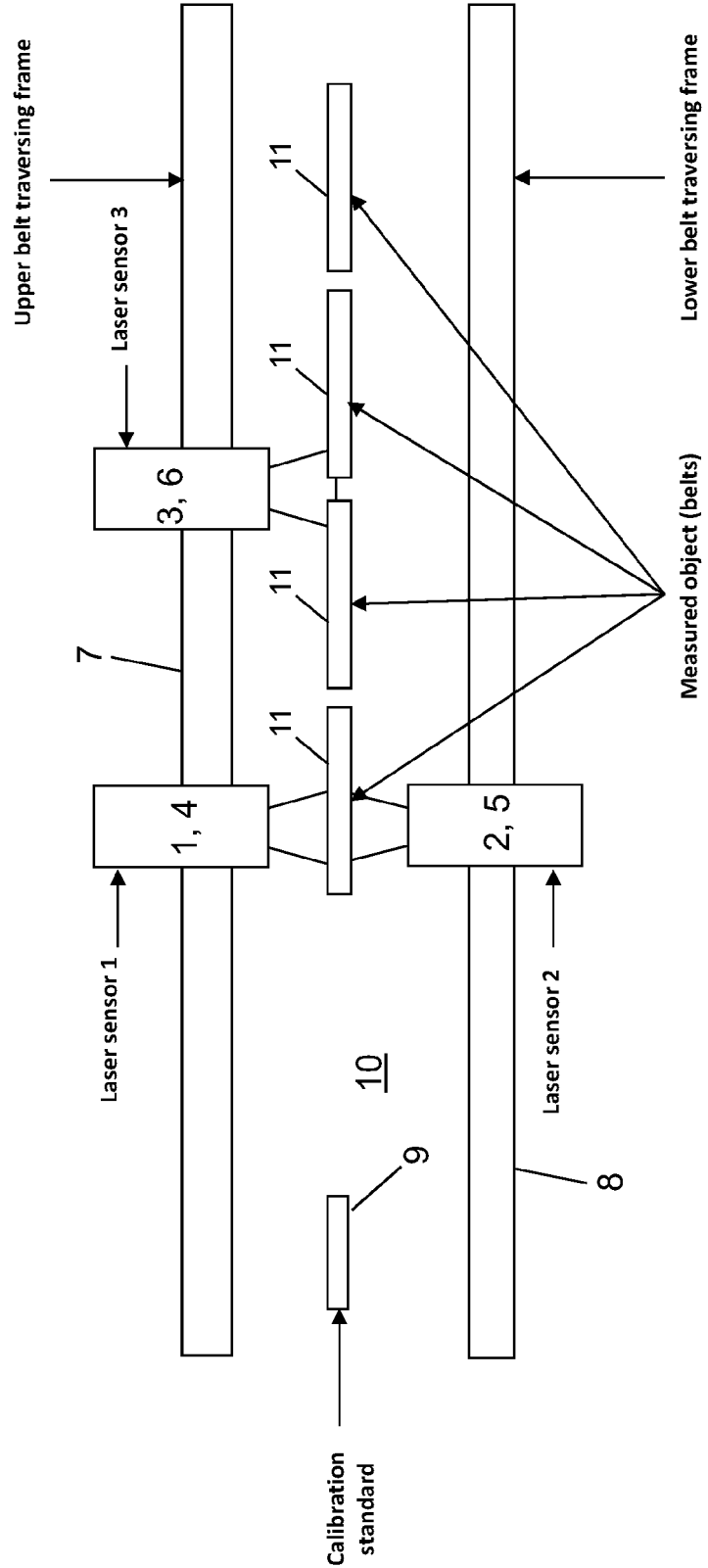

FIG. 9 shows step four. As soon as sensor pair 1, 2 has passed the left edge of the first belt 11, the third sensor 3 moves to the right edge of the second belt and waits there for the edge detection, which sensor pair 1, 2 performs. Sensor pair 1, 2 travels further immediately to the right and continuously performs the thickness measurement on the first belt 11.

Figure 10:
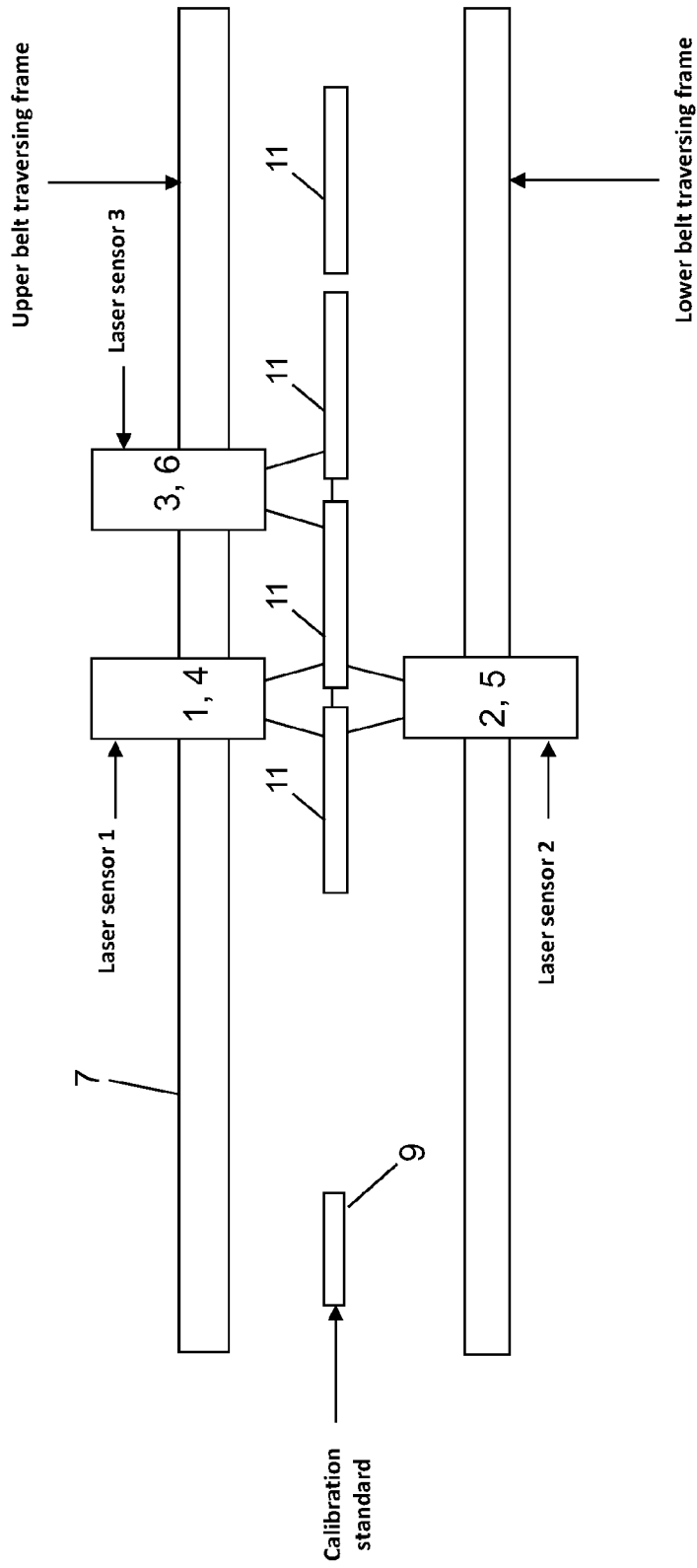

FIG. 10 shows step five. If sensor pair 1, 2 finds the first edge of the second belt 11, a width measurement of the second belt 11 is performed together with the third sensor 3. Sensor pair 1, 2 traverses immediately.

Figure 11:
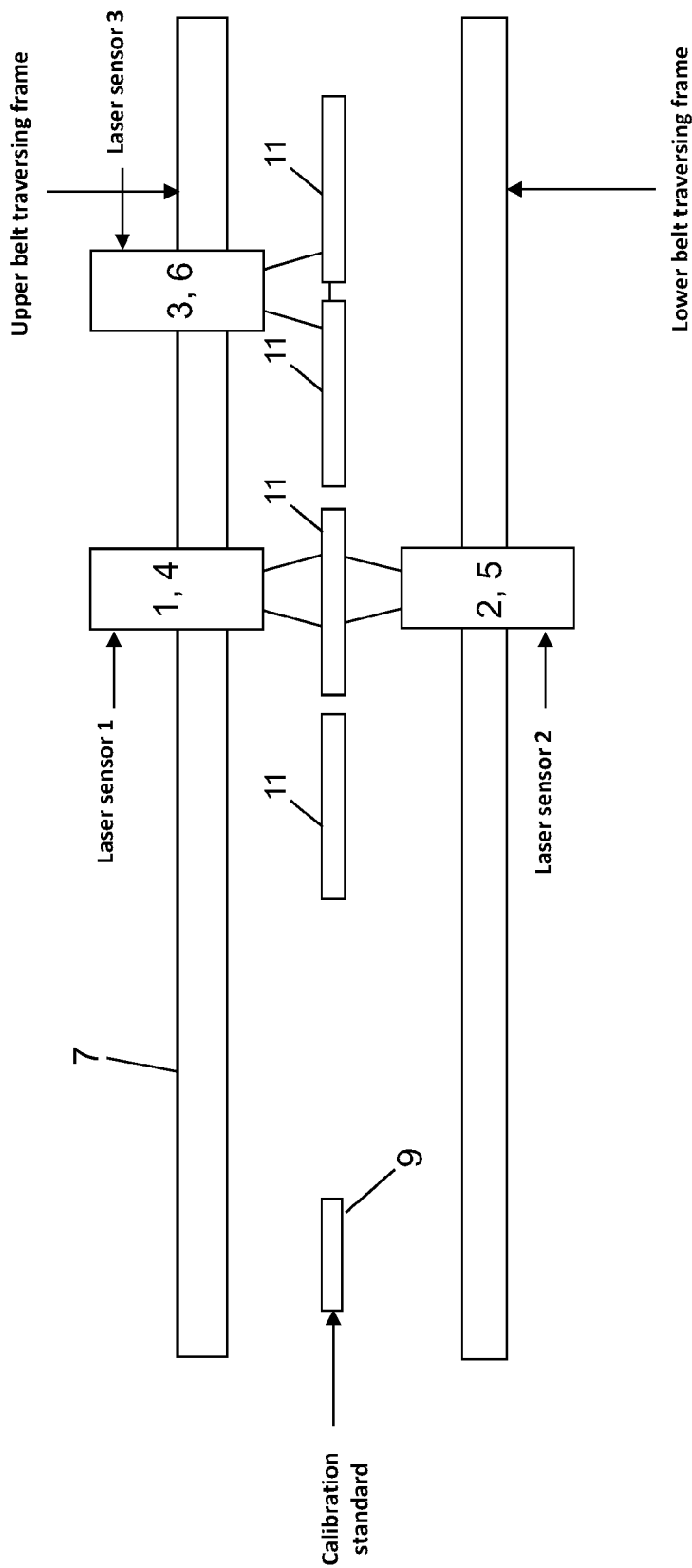

FIG. 11 shows step six. As soon as sensor pair 1, 2 no longer finds an edge, the third sensor 3 is positioned on the second edge of the third belt 11. Sensor pair 1, 2 continues to traverse immediately and performs the thickness measurement.

Figure 12:
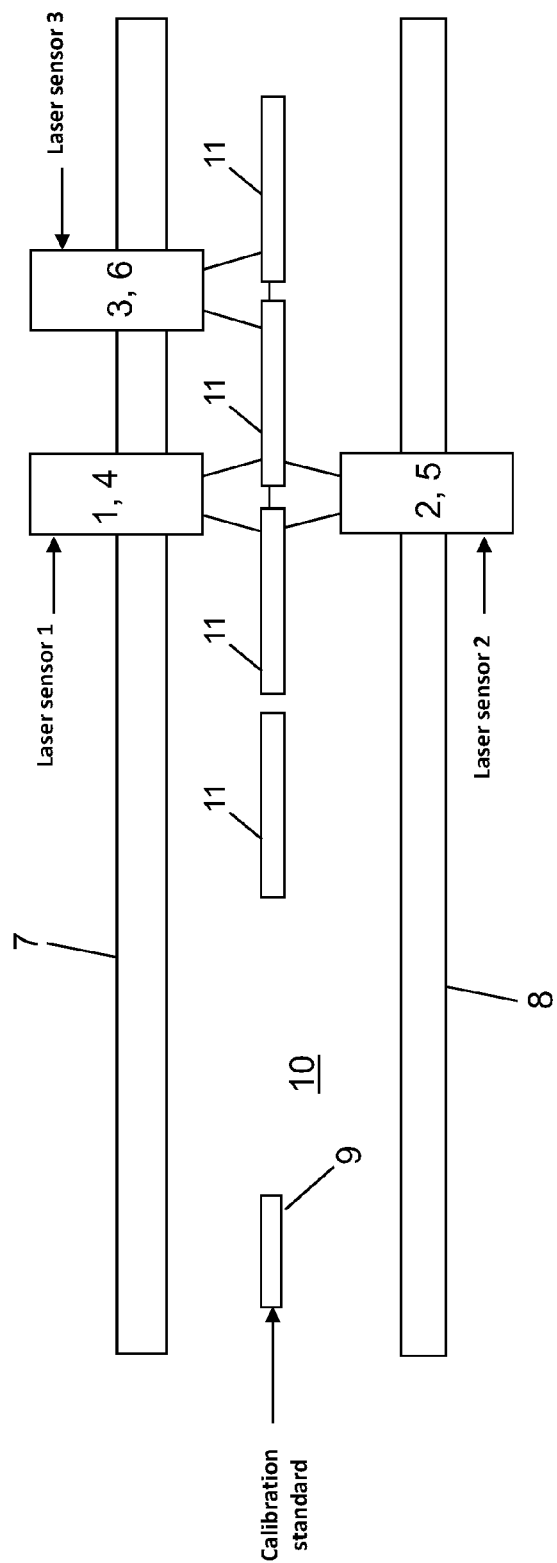

Step seven according to FIG. 12 corresponds in the sequence of step 5 from FIG. 10.

Figure 13:
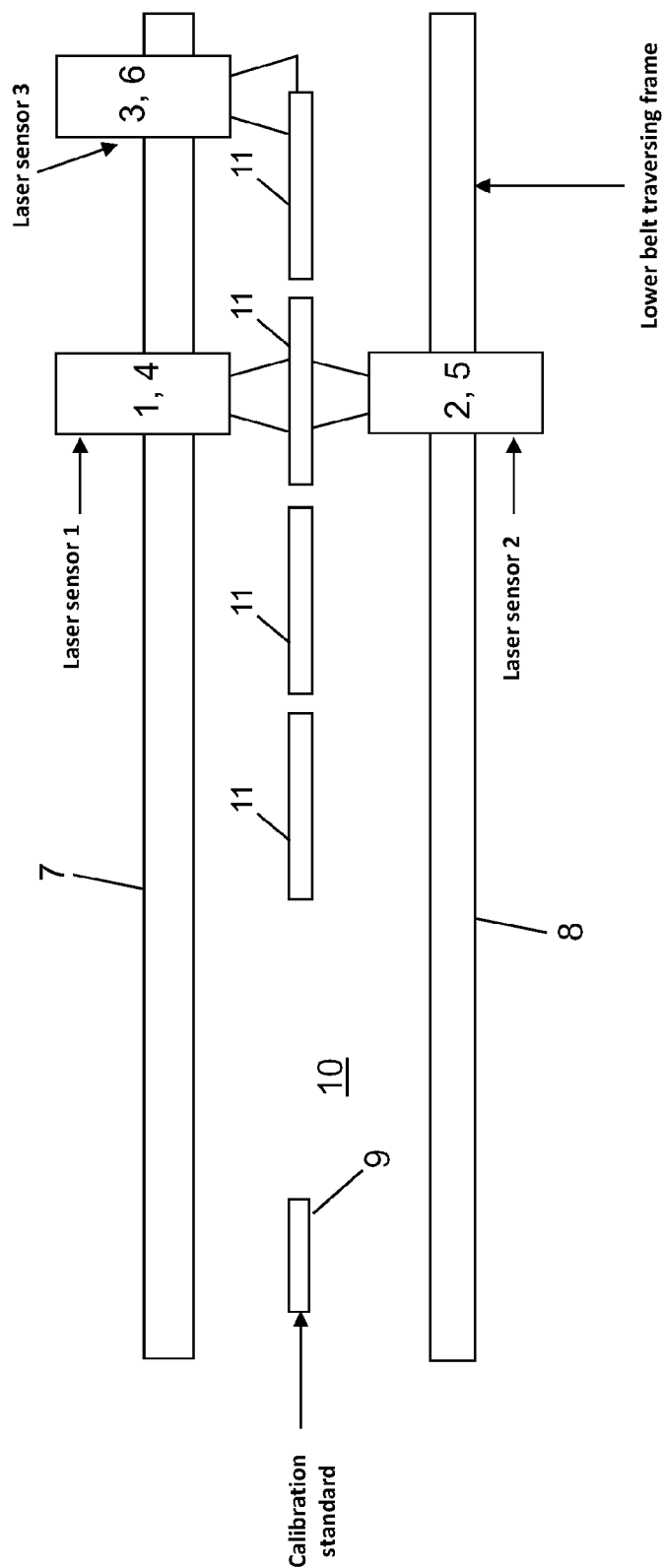

Step eight according to FIG. 13 corresponds to step 6 from FIG. 11.

Figure 14:
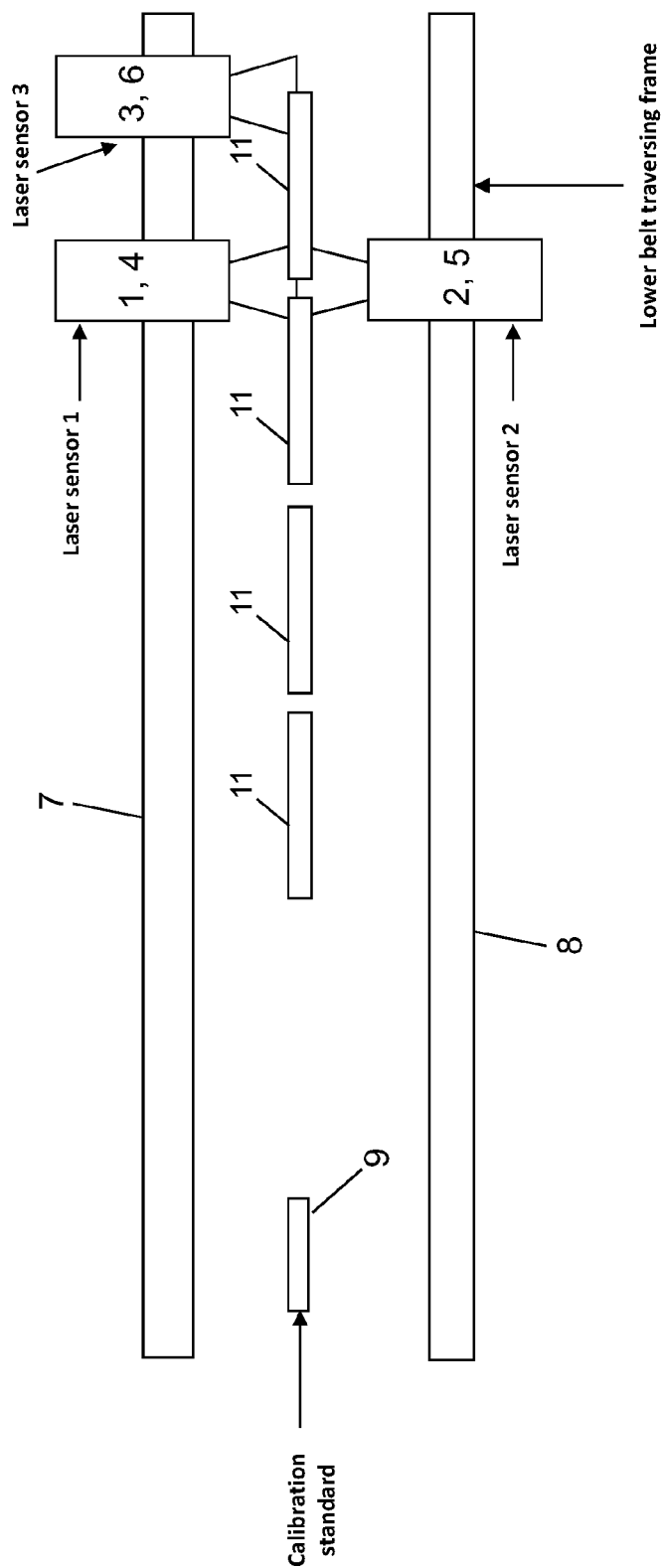

Step nine according to FIG. 14 corresponds to step 7 from FIG. 12.

Figure 15:
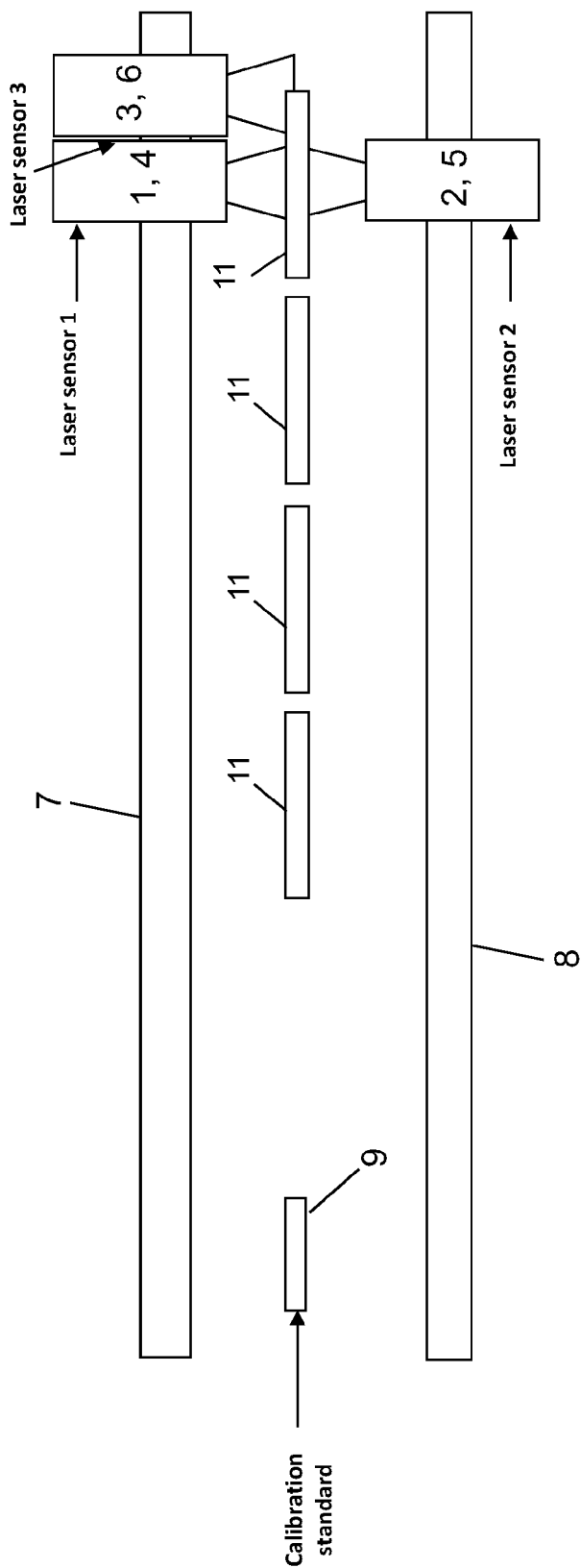

FIG. 15 shows the thickness measurement with step ten. Sensor pair 1, 2 performs the thickness measurement. The third sensor 3 can be positioned away from the end gap so that sensor pair 1, 2 is movable to the outer edge of the last belt and a thickness measurement can be performed correspondingly.

Figure 16:
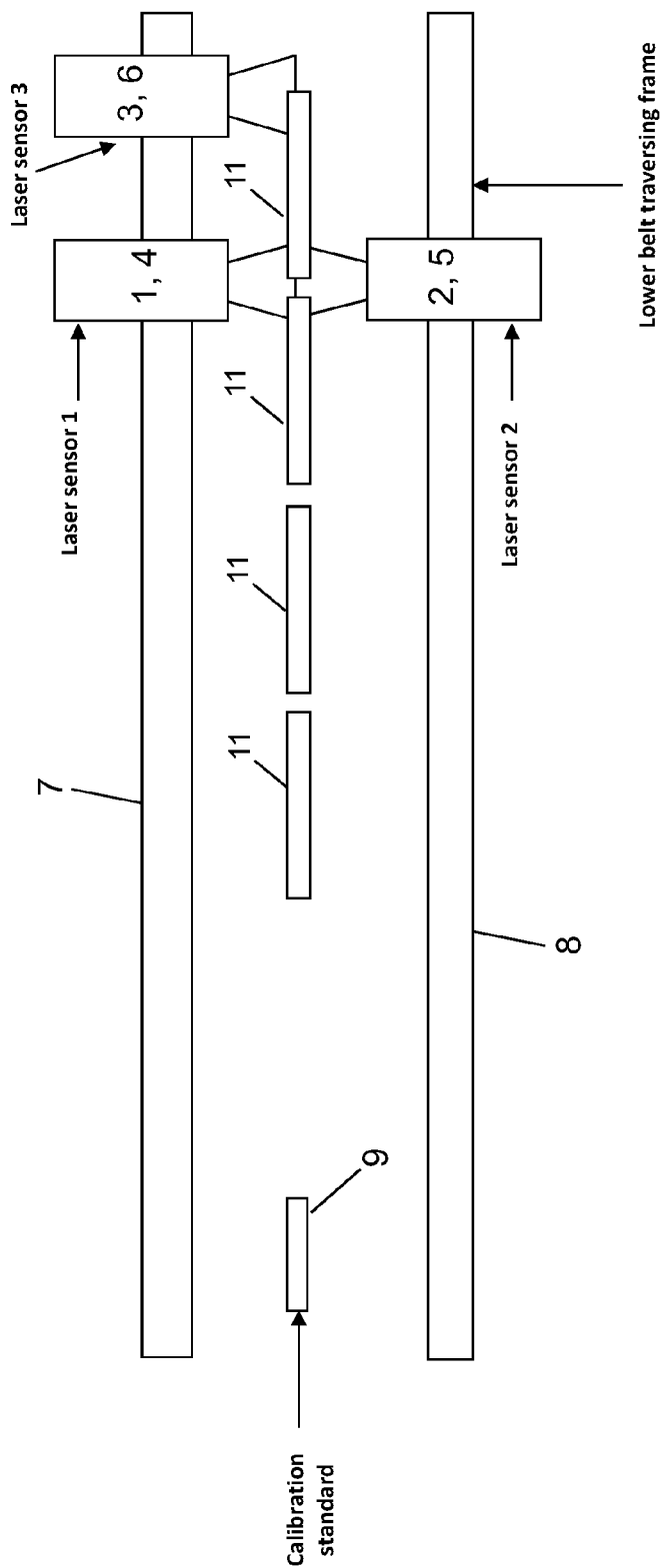
Figure 17:
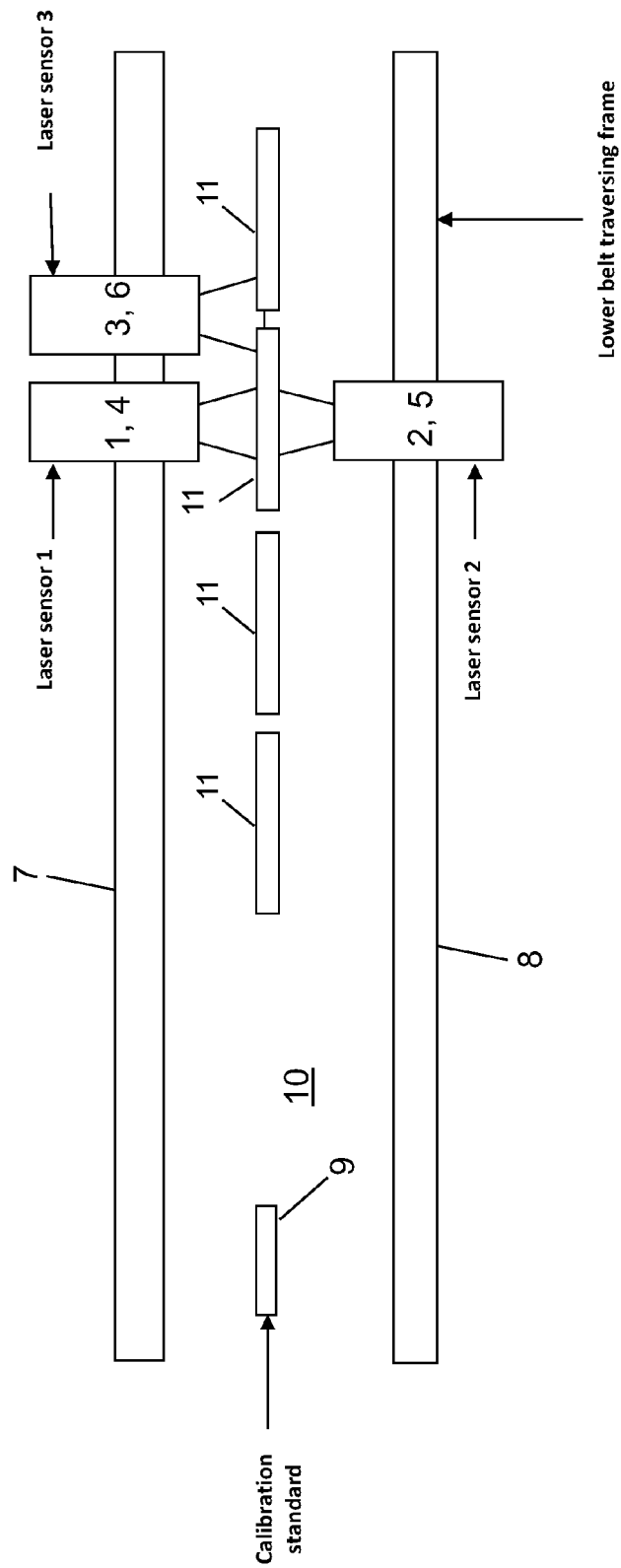
Figure 18:
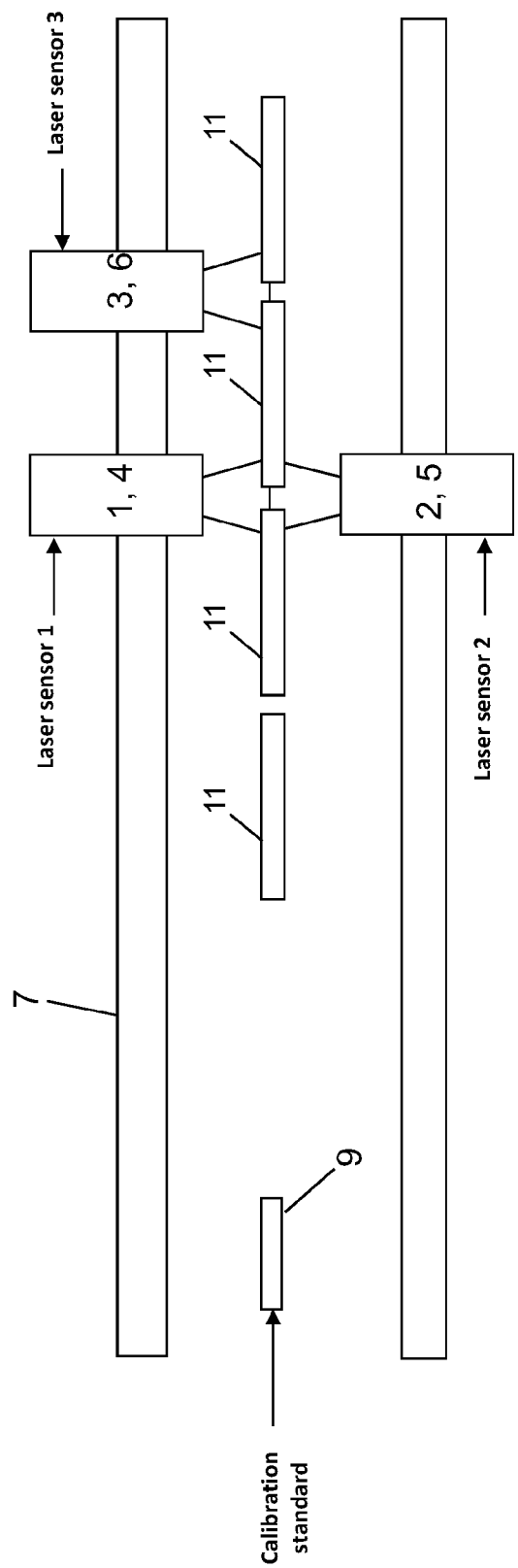
Figure 19:
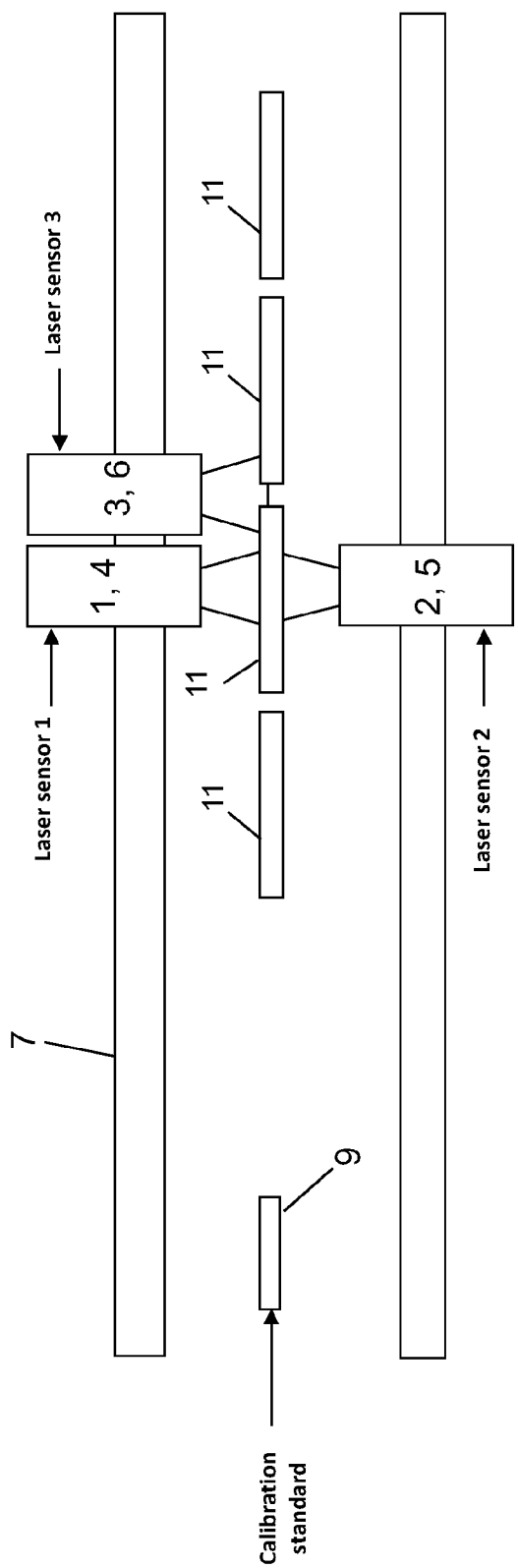
Figure 20:
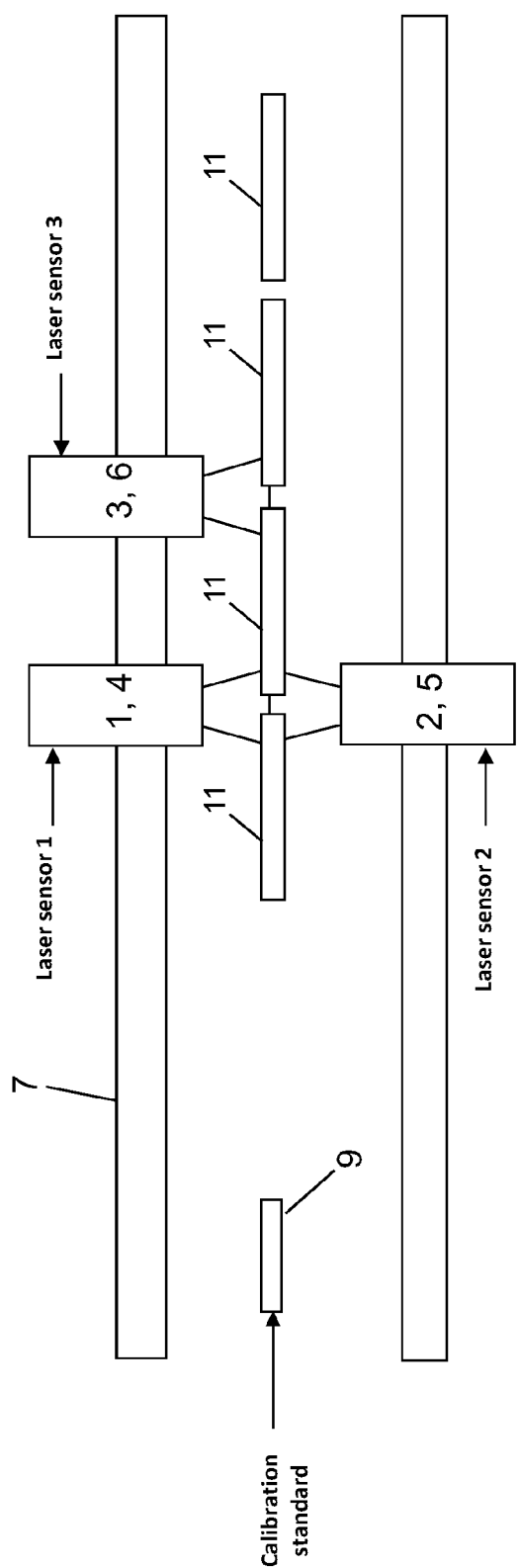
Figure 21:
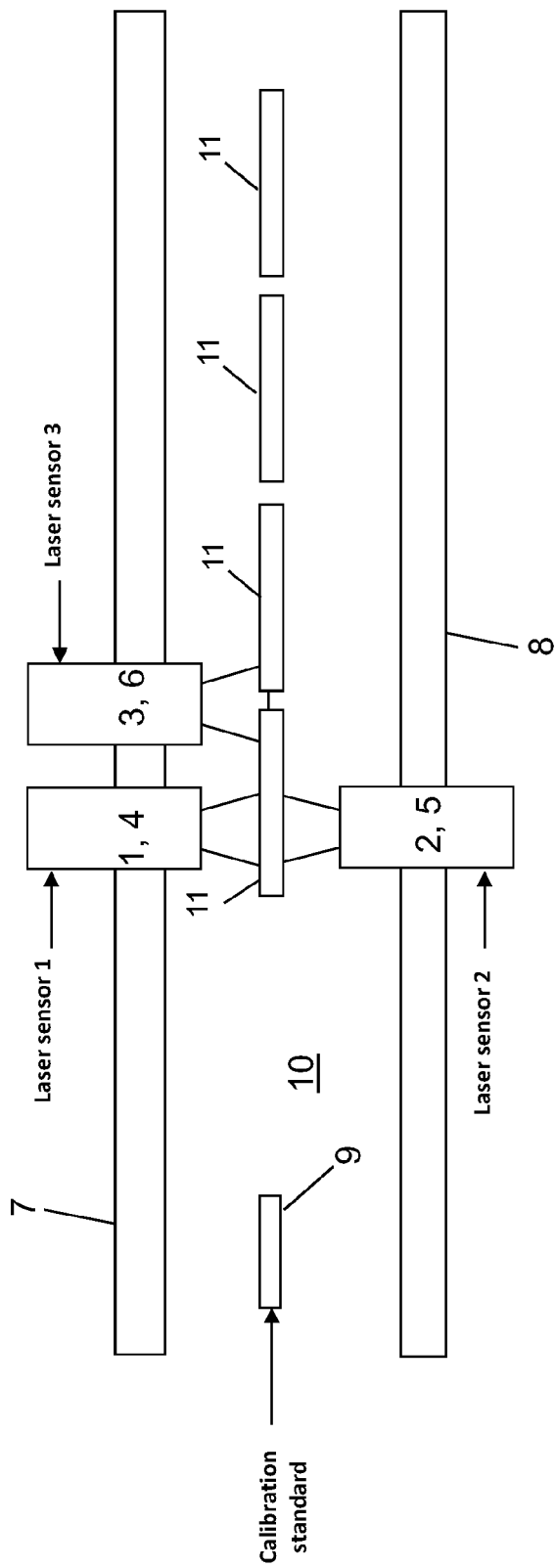
Figure 22:
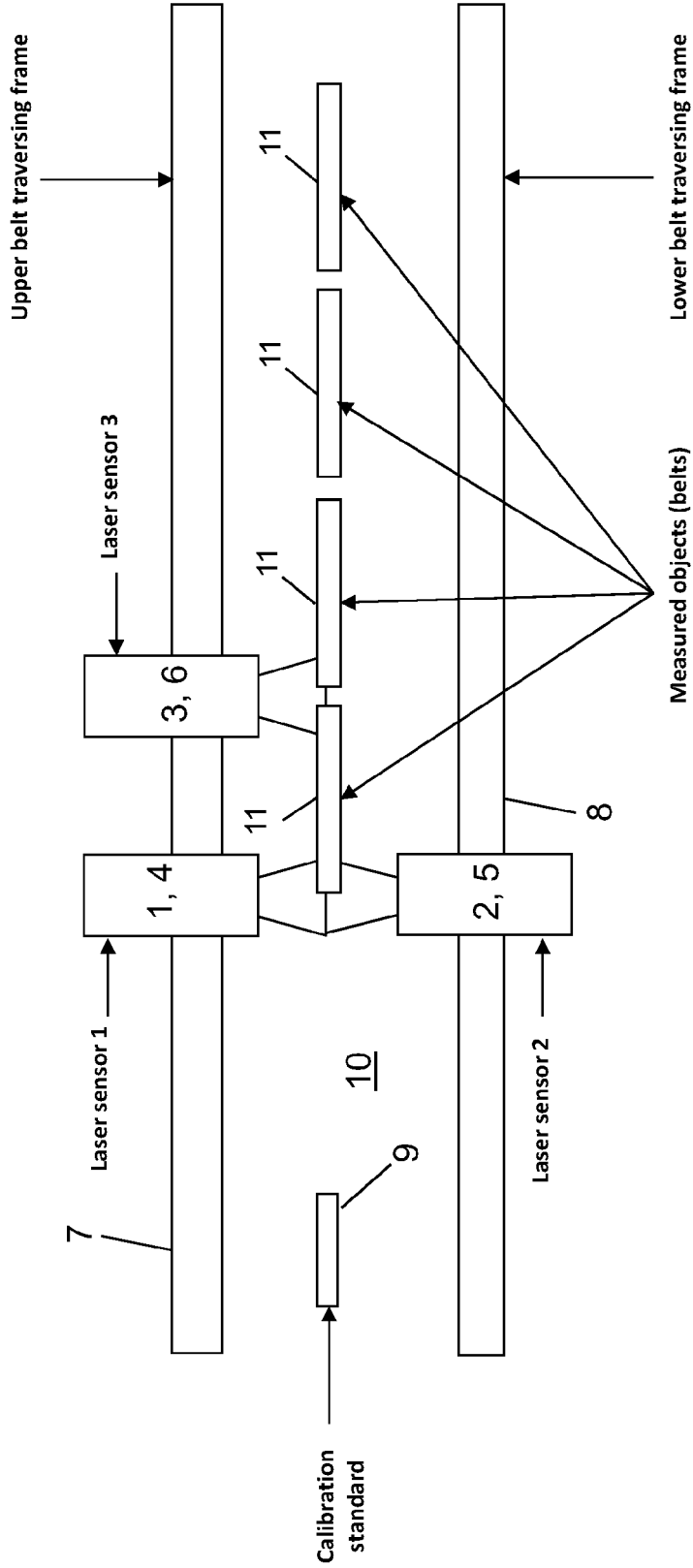

FIG. 16 shows step eleven, according to which sensor pair 1, 2 is continuously moved to the left. Correspondingly, sensor pair 1, 2 continuously performs thickness measurement. The same course is followed as in the case of movement to the right. The third sensor 3 follows sensor pair 1, 2. As soon as sensor pair 1,2 no longer finds an edge, the third sensor is moved to the next belt edge. The width measurement is performed as long as sensors 1 and 2 find an edge. The procedure corresponding to steps eleven to seventeen takes place in FIGS. 16 to 22, namely the detection of the respectively next edge, the thickness measurement, and the width measurement, in a sequence corresponding to the number of belts 11.

Figure 23:
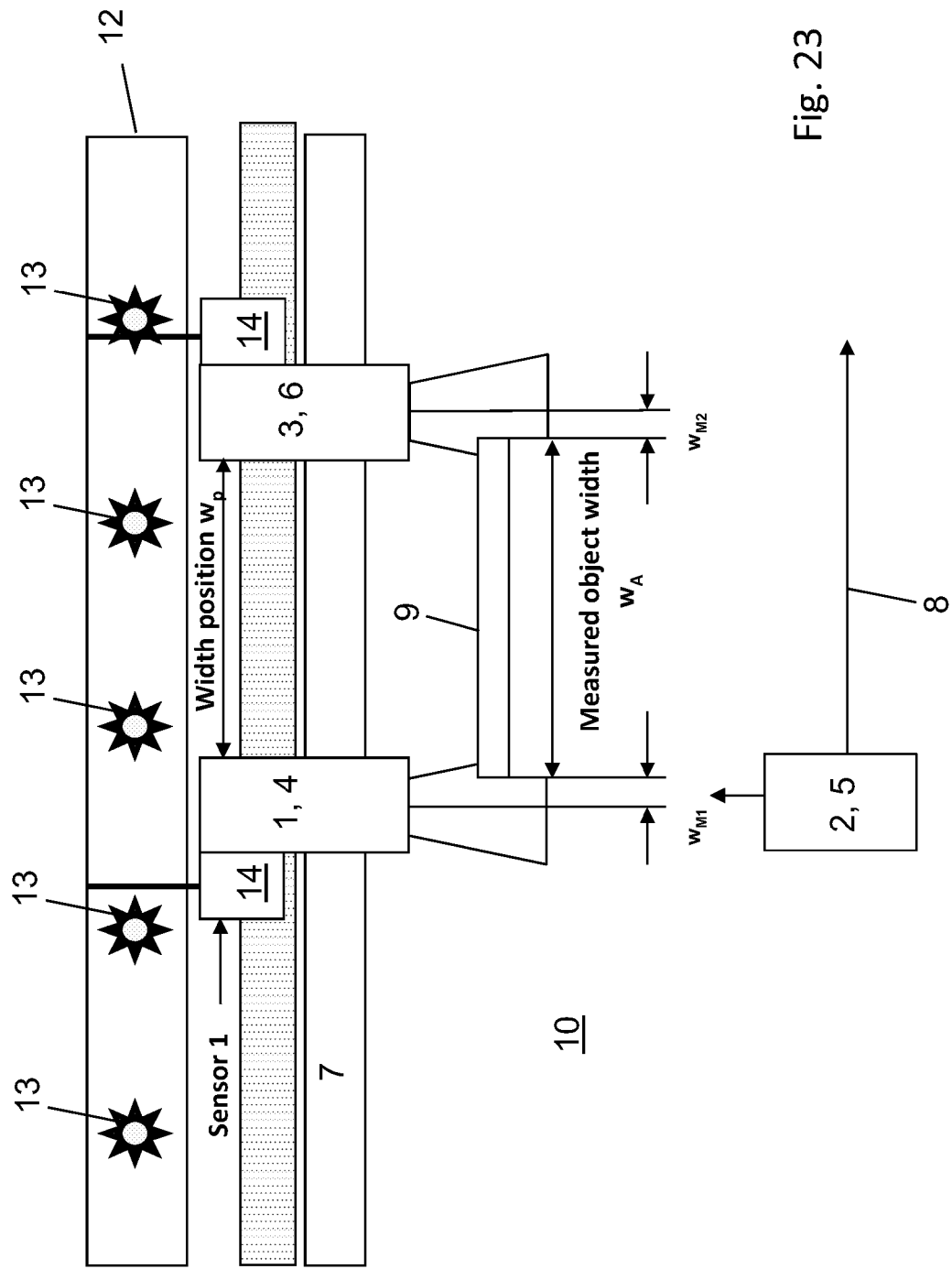

FIG. 23 shows a further specific embodiment of a device according to the invention, according to which special temperature compensation is provided.

Reference marks are introduced into a ruler 12 made of a material having the least possible thermal expansion, for example carbon fiber-reinforced plastic (CFP) or glass ceramic material (Zerodur®), the temperature expansion of which is negligible. The marks can be detected with a further sensor 14, which is mounted on sensor carriage 4 and/or 6 traversing with unit 7.

Each mark i (i=1 . . . n) is associated with a position $M_{Pi\,(t0)}$ on the incremental measuring system in a calibration process at a reference temperature, for example at room temperature (e.g. 20° C.). This occurs, for example, because the sensor carriage is moved over the width in a calibration passage at time t0, and thus the positions of the reference marks 13 are detected with the further sensor 14 and recorded in a memory. The calibration of the separation of the reference marks could also take place in the laboratory, by measuring the separation of the reference marks on the ruler with an independent means of measurement (separation sensor, scale, etc.) under known ambient conditions (room temperature T0) and storing it.

Subsequently, the position of the reference marks is measured at specific intervals, for example at the time t. If the length of the guide 7 changes, perhaps by temperature expansion, the positional value of mark 13 at time t changes, and the expansion of guide 7 can be measured via the change of the difference of two mark positions $M_{Pi}$ and $M_{Pi+1}$. Taking account of the expansion of guide 7 or a temperature variation, incremental ruler 15, in which case $$\Delta w(t)=(M_{P_i(t0)}-M_{P_i+1(t0)})-(M_{P_i(t)}-M_{P_i+1(t)})$$

is valid for the width at the time t $$w_A=w_P+w_O-(w_{M1}+w_{M2})-\Delta(t)$$

The marks 13 can be configured in any way. A skilled combination of mark 13 and a further sensor 14 is decisive. Mark 13 must be easily detected by the sensor. Nearly any geometric, optical, magnetic, or electrical marks 13 can be used here. Furthermore, it is necessary that the position of mark 13 is determined with sufficient accuracy. Therefore, sensors that measure nearly at a point, for example optical sensors, are particularly favorable.

According to the invention, the preceding task is addressed by a device having the features of the pending claims provided herein. Accordingly, the device comprises at least one contactless sensor for width measurement of the respective object. The sensor is movable crosswise to the longitudinal direction or conveying direction of the object. A second sensor opposite the first sensor, which serves together with the first sensor for conventional thickness measurement of the object, is provided on the opposite side of the object. The two sensors can be moved above and below the object on opposite sides.

In addition to piece goods, it is possible for the "target" to be belts or webs, for example plastic webs, metal belts, paper webs, as well as fleece, etc.

Corresponding to the features of the pending claims provided herein, the width measurement is combined with the thickness measurement, one of at least two sensors being involved with both measurements. According to the invention, the measurement of width and thickness is combined in a single device, so that the least possible equipment expense is required.

The processing of the measurement as well as basic algorithms correspond to the method used up to now using contactless sensors, so that it is possible to dispense with an explanation of this.

It is particularly advantageous to make the sensors to be used as optical sensors, it being possible for them to be laser sensors or laser profile sensors or laser scanners The laser profile sensors measure the width of the object, for example the width of one or more belts lying/running beside one another, each of the two sensors detecting an edge of the belt to be measured. The laser line here is located crosswise to the edge of the belt. The laser profile sensors are fastened to sensor carriages, which rest on a guide or crossing unit in a further advantageous way, so that width measurement can be performed on belt material of different width. Correspondingly, it is possible to move the laser profile sensors crosswise to the belt direction corresponding to the length of the crosspiece.

In a further advantageous way, the two sensors are coupled in their movement, for example mechanically, and accordingly run synchronously. Other kinds of coupling also can be realized.

As already presented above, the two sensors move along a crosspiece or the like, advantageously on a carriage, together above and below the object to the edge areas or edges of the object, and certainly over the object and up to the opposite edge area or to the edge and back. Moving along and determining the edge coordinates of the object serves for width measurement and running over the object serves for thickness measurement.

The measuring device advantageously includes at least a third contactless sensor, advantageously also an optical sensor, in particular a laser sensor or a laser profile sensor or laser scanner, which serves for width measurement together with the first sensor. The third sensor operates independently of the first two sensors and is advantageously movable on a carriage with its own drive along one of the two crosspieces. Advantageously, the third sensor travels on the same crosspiece as the first sensor. It is to be noted that the term "crosspiece" is to be understood simply as a linear guide.

The measuring device can be associated with a C-frame or O-frame, it being essential that the sensors are movable along a crosspiece crosswise to the direction of travel of the object.

It is further advantageous if the measuring device includes a calibration standard, on which reference measurements serving for calibrating the sensors/the measuring system can be performed. Integral calibration of the measuring device is performed in this way.

It is further advantageous if a gauge, for example a ruler or the like, containing reference marks, having less or no thermal expansion at all in the relevant temperature range, is provided for compensation of thermal expansions of the object, in particular the belt. It is possible to make the reference marks as optical, electrical, and/or magnetic marks, which are detectable corresponding to their nature. The position of the reference marks can be detected with one of the already present sensors or by a further sensor during a possibly separate calibration run.

The invented method according to the pending claims provided herein uses the device according to the invention, two sensors coupled in their movement and movable parallel to one another (sensor 1 and sensor 2) being used for thickness measurement and a further sensor (sensor 3), together with one of the first two sensors (sensor 1 or sensor 2) being used for width measurement. The first two sensors move at a predetermined measuring speed along the crosspiece and advantageously will move continuously. The third sensor moves at a higher speed to the outer edge of the object, stops there or stays there until the first two sensors have reached the first edge of the object.

The method according to the invention can be used on individual objects or belts or even on belts running parallel to one another for measuring width and thickness.

In addition, it is advantageous if calibration of the thickness measurement and/or the width measurement takes place either before each measurement or at regular intervals or as needed, preferably on an integral calibration standard, which belongs to the device according to the invention.

Finally, explicit reference is made to the fact that the exemplary embodiments of the device according to the invention described above are used only for explanation of the claimed teaching, but the teaching is not restricted to the exemplary embodiments.

REFERENCE LIST 1 first sensor
2 second sensor
1, 2 sensor pair
3 third sensor
4 carriage, sensor carriage of 1
5 carriage, sensor carriage of 2
6 carriage, sensor carriage of 3
7 guide, crosspiece
8 guide, crosspiece
9 calibration standard
10 measurement gap
11 belt, target
12 ruler
13 mark
14 further sensor (for detection of the marks)
15 temperature-independent, incremental ruler

The invention claimed is:

1. A device for the combined measurement of the width and the thickness of a flat object with a measuring device, the measuring device comprising:
a first contactless sensor for width measurement on the object, the first contactless sensor being movable crosswise to either a longitudinal direction or a conveying direction of the object,
a second sensor opposite the first sensor on an opposite side of the object, the second sensor serving together with the first sensor for thickness measurement on the object, and
a third contactless sensor serving together with the first sensor for width measurement on the object,
wherein:
the first and second sensors move on first and second crosspieces, respectively, over and under the object and on opposite sides of the object, and
the third contactless sensor moves, independently from and via a drive independent of the first and second sensors, on a carriage mounted to one of the first and second crosspieces.

2. The device according to claim 1, wherein the flat object is at least one of a plate, a belt, or a web.

3. The device according to claim 1, wherein the first, second, and third sensors are optical sensors.

4. The device according to claim 1, wherein the first, second, and third sensors are at least one of laser sensors, laser profile sensors or laser scanners.

5. A method according to claim 1, wherein the first and second sensors are mechanically coupled in their motion.

6. The device according to claim 1, wherein the first and second sensors are movable along the first and second crosspieces, respectively, together above and below the object, to the edge areas or edges of the object, over the object and up to the opposite edge areas or edges and back, moving along and determining the edge coordinates of the object serving for width measurement and running over the object serving for thickness measurement.

7. The device according to claim 6, wherein the measuring device is associated with a C-frame or O-frame, and the first and second crosspieces are part of the frame.

8. The device according to claim 1, wherein the first and second sensors are movable on respective carriages mounted to the first and second crosspieces, respectively, together above and below the object, to the edge areas or edges of the object, over the object and up to the opposite edge areas or edges and back, moving along and determining the edge coordinates of the object serving for width measurement and running over the object serving for thickness measurement.

9. The device according to claim 1, wherein the third sensor moves on the first crosspiece.

10. The device according to claim 1, wherein the measuring device is associated with a C-frame or O-frame.

11. The device according to claim 1, wherein the measuring device comprises a calibration standard, on which reference measurements serving for calibration of the sensors/the-measuring system can be performed.

12. The device according to claim 1, wherein a gauge containing reference marks with the least possible thermal expansion is provided for compensation of thermal expansions of the measuring system, the reference marks being detectable corresponding to their nature, the positions of the reference marks being determinable with one of the sensors or by a further sensor during a calibration pass.

13. The device according to claim 12, wherein the reference marks are at least one of geometrical, optical, or magnetic marks.

14. The device according to claim 12, wherein the gauge is a ruler containing reference marks.

15. A method for combined measurement of a width and a thickness of a flat object, the method comprising the steps of:

providing a measuring device comprising:
- a first contactless sensor for width measurement on the object, the first contactless sensor being movable crosswise to either a longitudinal direction or a conveying direction of the object,
- a second sensor opposite the first sensor on an opposite side of the object, the second sensor serving together with the first sensor for thickness measurement on the object, wherein the two sensor move over and under the object on opposite sides of the object, and
- a third sensor coupled to the second sensor, moving the coupled second and third sensors parallel to one another to measure the thickness of the flat object; and utilizing the first contactless sensor together with one of the two coupled second and third sensors to measure the width of the flat object.

16. The method according to claim 15, wherein the two coupled sensors are moved with a predetermined measurement speed, and the first sensor is moved at a higher speed to the outer edge of the object and stops there until the two coupled sensors have reached the first edge of the object.

17. The method according to claim 16, wherein the predetermined measurement speed is a continuous speed.

18. The method according to claim 15, wherein several belts running beside one another, are measured with respect to width and thickness.

19. The method according to claim 18, wherein the several belts are parallel to one another.

20. The method according to claim 15, wherein calibration of at least one of the thickness measurement or the width measurement is performed on a calibration standard at least one of before each measurement, at regular intervals, or as needed.

21. The method according to claim 15, wherein a gauge containing reference marks, having the least possible thermal expansion, is provided for compensation of thermal expansions of the object, wherein the reference marks are detected corresponding to their nature, the positions of the reference marks being determined with one of the sensors or by a further sensor during a calibration pass.

22. The method according to claim 21, wherein the reference marks are at least one of geometrical, optical, or magnetic marks.

23. The method according to claim 21, wherein the gauge is a ruler containing reference marks.

* * * * *